United States Patent
Swett et al.

(10) Patent No.: US 8,224,787 B2
(45) Date of Patent: Jul. 17, 2012

(54) REDUNDANT, MULTI-DIMENSIONAL DATA PARTITIONING: METHODS, PROGRAM PRODUCT AND SYSTEM

(75) Inventors: Ian Swett, Pasadena, CA (US); W. Daniel Hillis, Encino, CA (US)

(73) Assignee: Applied Minds, LLC, Glendale, CA (US)

( * ) Notice: Subject to any disclaimer, the term of this patent is extended or adjusted under 35 U.S.C. 154(b) by 375 days.

(21) Appl. No.: 12/508,413

(22) Filed: Jul. 23, 2009

(65) Prior Publication Data

US 2011/0022816 A1    Jan. 27, 2011

(51) Int. Cl.
*G06F 17/30*    (2006.01)

(52) U.S. Cl. ......................................... 707/668

(58) Field of Classification Search .................. 707/668, 707/673, 797, 798, 802, 968, 972, E17.054
See application file for complete search history.

(56) References Cited

U.S. PATENT DOCUMENTS 5,551,027 A * 8/1996 Choy et al. ............................ 1/1
6,665,684 B2 12/2003 Zait et al.

OTHER PUBLICATIONS

Baer, Hermann; "Partitioning in Oracle Database 11g"; Jun. 2007, An Oracle White Paper; retrieved online: http://www.oracle.com/technology/products/bi/db/11g/pdf/partitioning-11g-whitepaper.pdf; 13 pages.
Aldridge, David; "Thoughts on Range-Range Composite Partitioning"; Jan. 14, 2007; retrieved online: http://oraclesponge.wordpres.com/2007/01/14/thoughts-on-range-range-composite-partitioning; 4 pages.
"Partition (database)"; Jun. 3, 2005; updated Jun. 29, 2009; retrieved online: http://en.wikipedia.org/wiki/Partition_(database).

* cited by examiner

*Primary Examiner* — Fred I Ehichioya
(74) *Attorney, Agent, or Firm* — Michael A. Glenn; Glenn Patent Group (57) ABSTRACT

Horizontal partitioning can handle a transaction by accessing a single node only if the transaction is restricted along the single partitioned dimension. Composite partitioning allows for partitioning along more than one dimension, but can only handle a transaction by accessing a single node if the transaction is limited along all partitioned dimensions. A partitioning method partitions a tuple space along more than one dimension and, by storing tuples redundantly, allows transactions restricted along one or more of the partitioned dimensions to be handled by accessing a single node. Other embodiments include a computer program product and a system for partitioning a tuple space.

30 Claims, 11 Drawing Sheets

REDUNDANT, MULTI-DIMENSIONAL DATA PARTITIONING: METHODS, PROGRAM PRODUCT AND SYSTEM

BACKGROUND OF THE INVENTION

1. Field of the Invention

In general, the invention relates to database management. More particularly, the invention relates to methods, systems and program product for redundant, multi-dimensional data partitioning.

2. Background Discussion

The need for reliable and efficient storage of large amounts of complex data continues to increase dramatically. Indeed, while there have been great advances in storage technology, for example, the increasing capacity and decreasing cost of hard disks, the need for extensive storage seems to have outpaced these advances. As a result, storage of truly large amounts of data on a single server is in many cases impractical and a distributed approach is desirable. Moreover, even in those cases where storage can be handled by a single machine, a distributed database may offer superior reliability and more efficient load handling.

Typically, implementing a database in a distributed manner involves partitioning. Partition of a database may be defined as "a division of a logical database or its constituting elements into distinct independent parts." In many distributed databases, each partition is stored at one node within the distributed database. While the physical architecture of a database need not have a one-to-one correspondence with the logical structure of the database, it is often the case that each node is stored on a separate server. In such cases, partitioning distributes the storage requirements across multiple machines, thus increasing the total storage capability of the database. Moreover, if a transaction, such as an 'INSERT' or 'SELECT', only requires access to data stored within one partition, the transaction may be executed by accessing only a single node. Other nodes remain free to handle other transactions concurrently, increasing the load handling capabilities of the database as a whole.

The technique of routing queries to the appropriate nodes based on a partitioning strategy is commonly known as partition pruning. There are reports that partition pruning can often improve query performance by several orders of magnitude. For example, in the case of a database that contains a record of orders, partitioned by week, a query requesting orders for a single week need only access a single partition. If the table had 2 years of historical data, this query could access only a single partition to satisfy the query, instead of all 104 partitions. This query could potentially execute 100 times faster, simply because of the partition pruning. Oracle Corporation, *Partitioning in Oracle Database 11g*, white paper (2007). Much of the skill in devising an effective partitioning strategy thus involves anticipating common transactions and partitioning such that the common transactions can be handled by a single node.

For purposes of further illustration, consider a database storing data items in the form of tuples of length N, expressed as:

$$I = (k_1, k_2, \ldots, k_j, \ldots, k_N). \quad (1)$$

where $k_j$ are values, selected from the jth key within a list of N keys.

Each key within the key list is defined by an ordered list of values $v_i$. A key may thus be expressed as:

$$K_j = \{v_1, v_2, \ldots, v_i, \ldots, v_{Mj}\}. \quad (2)$$

In many instances, the ordered list of values is simply a range of integers. For example, a key may be defined as the integers between 1 and 10, inclusive. That is:

$$K_x = [1, 10]. \quad (3)$$

Thus, for a key list S of N=2 keys defined as:

$$S = \{K_1, K_2\} = \{[2, 7], [4, 13]\}, \quad (4)$$

one possible tuple is:

$$I = (3, 8). \quad (5)$$

Accordingly, the set of all possible tuples can be considered as an N-dimensional tuple space, with each dimension corresponding to the range of possible values for a particular key within the key list.

Figure 1:
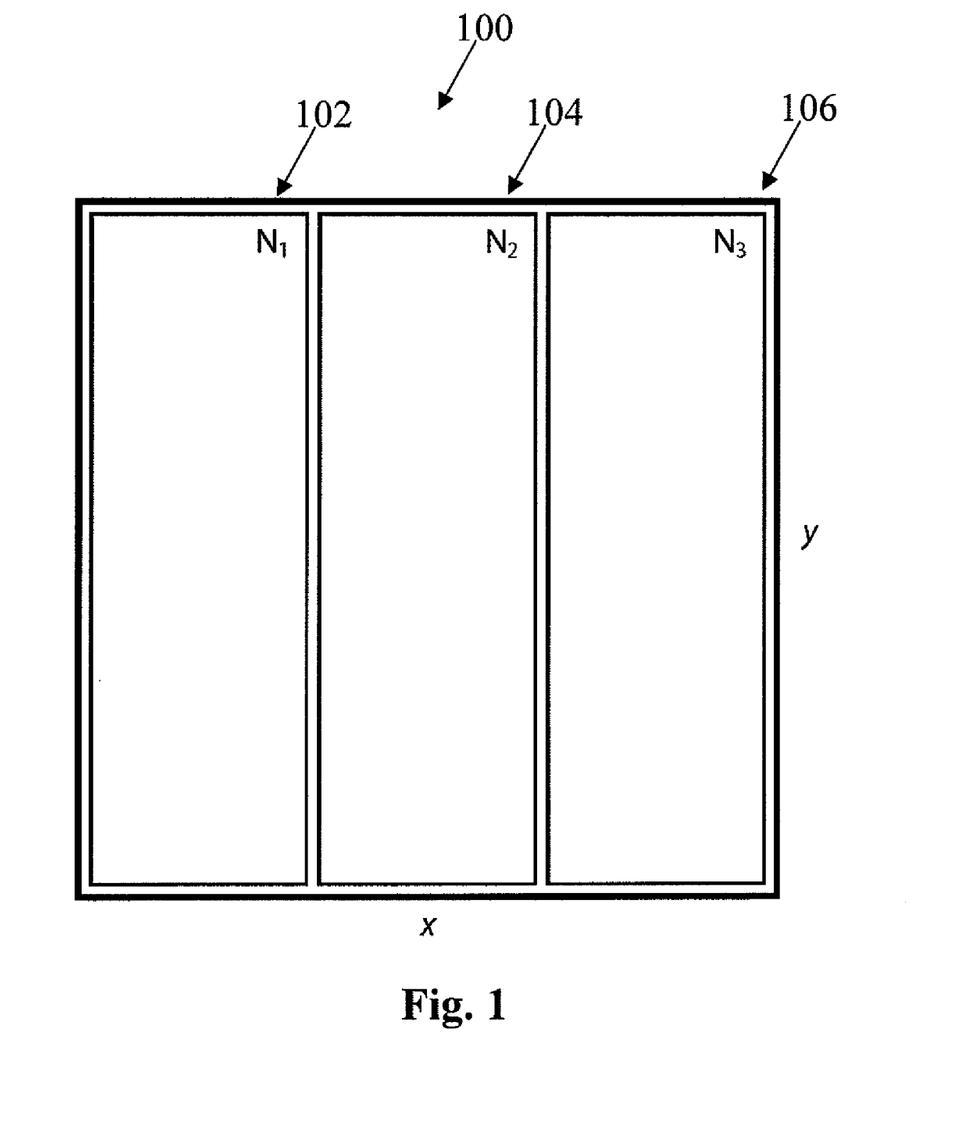
FIG. 1 provides a diagram of a horizontal partitioning method.

In one commonly used partitioning method, termed horizontal partitioning, partitions are created by segmenting a tuple space along a single dimension. The term "horizontal" derives from an alternative paradigm of viewing data within the database as rows within tables. In horizontal partitioning, the partitions are divided by lines parallel to the table rows, which are horizontal. A graphical representation of horizontal partitioning is shown in FIG. 1, in which a 2-dimensional tuple space is partitioned along the x-dimension into three partitions $N_1$, $N_2$, and $N_3$ 102-106. As shown in FIG. 1, the partition boundaries need not correspond to "horizontal" lines in the tuple space.

The boundaries of the partitions are defined by key ranges within the key corresponding to the dimension along which partitioning occurs; for example, the x-dimension in FIG. 1. Here, a key range is a contiguous subset of the indices into the ordered list of values that define a key. A key range on a key $K_j$ is expressed by a pair of values representing the ends of the range, inclusively; that is:

$$r^j = [v_{min}, v_{max}]. \quad (6)$$

Partitioning can be thus understood as assigning a storage location—in other words, a node on which storage will occur—based on the location of the stored tuple within the tuple space. As a more specific example, suppose the dimensions x and y correspond to a key list:

$$S = \{K_1, K_2\} = \{[0, 99999], [`---`, `ZZZZZZ`]\}, \quad (7)$$

with $K_1$ (and the x-dimension) representing 5-digit zip codes and $K_2$ (and the y-dimension) representing six-letter first names of customers. One possible horizontal partitioning strategy consistent with FIG. 1 is defined by the key ranges:

$$r_1^1 = [0, 33332], \quad (8)$$

$$r_2^1 = [33333, 66665], \text{ and} \quad (9)$$

$$r_3^1 = [66666, 99999]; \quad (10)$$

where tuples having $k_1$ in $r_1^1$ are stored by node $N_1$, tuples having $k_1$ in $r_2^1$ are stored by node $N_2$, and tuples having $k_1$ in $r_3^1$ are stored by node $N_3$. This partitioning strategy is well-suited to handling transactions that access tuples within a range restricted along the x-dimension. For example, the select statement:

```
SELECT
    K₁
FROM
    S
WHERE
    K₁ = 90210
``` can be handled by node $N_3$ alone. Similarly, a partitioning strategy defined by the key ranges:

$$r_1^2 = [`---`, `\text{Davis-}`] \quad (11)$$

$$r_2^2 = [`\text{Davisa}`, `\text{Smith-}`] \quad (12)$$

$$r_3^2 = [`\text{Smitha}`, `ZZZZZZ`] \quad (13)$$

is well-suited to handling transactions that access tuples within a range restricted along the y-dimension. However, the first strategy provides no benefit in handling transactions that access tuples within a range restricted along the y-dimension, and the second strategy provides no improvement in handling transactions that access tuples within a range restricted along the x-dimension. Thus, horizontal partitioning provides no increase in access efficiency in handling transactions restricted along a dimension other than the single partitioned dimension.

Figure 2:
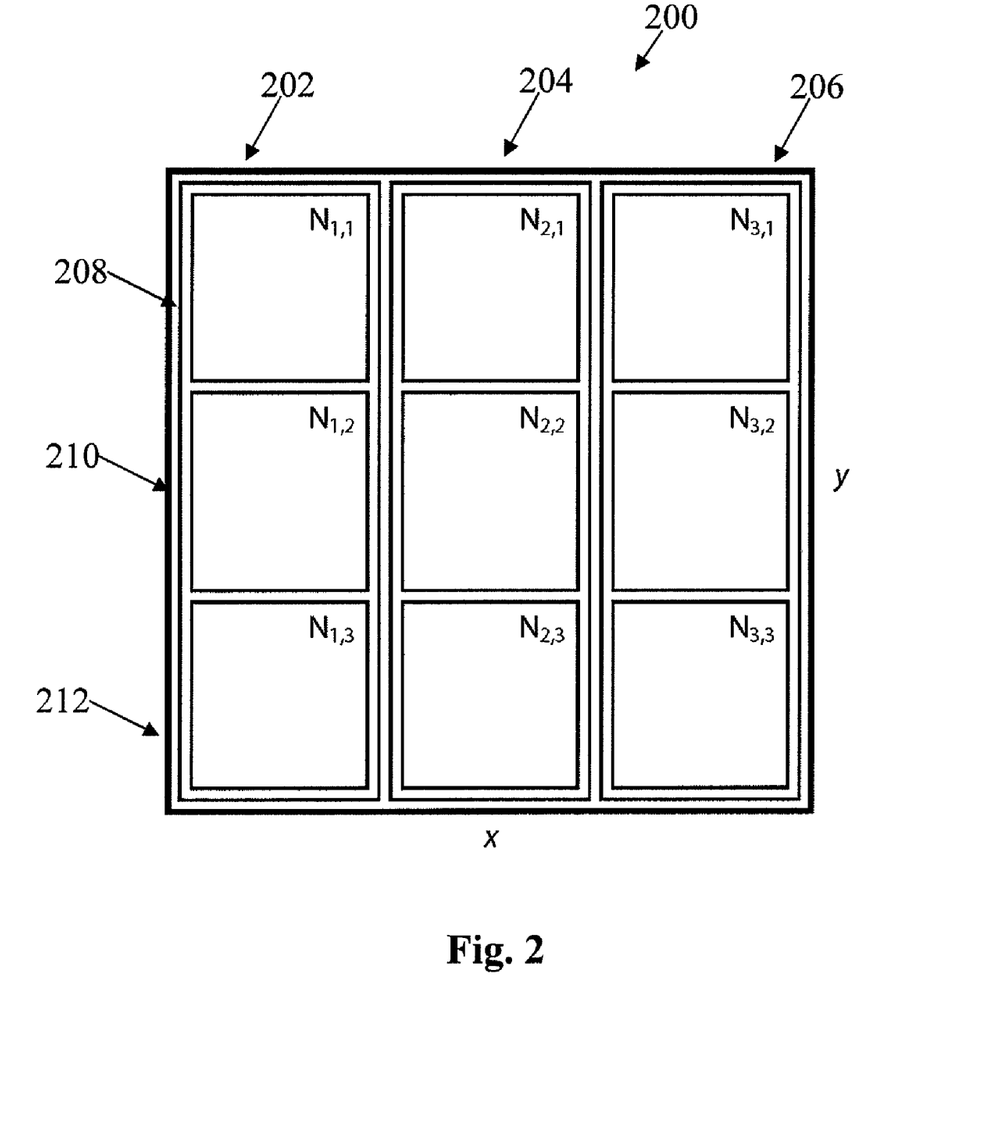
FIG. 2 provides a diagram of a composite partitioning method.

Another commonly used partitioning method, termed composite partitioning, allows the tuple space to be partitioned along more than one dimension. As described in the 2007 Oracle White Paper, "the table is partitioned by data distribution method one and then each partition is further subdivided into sub-partitions using a second data distribution method. All sub-partitions for a given partition together represent a logical subset of the data." This method is illustrated in FIG. 2. Here, the tuple space is first partitioned along the x-dimension using a set of key ranges $\{r_1^1, r_2^1, r_3^1\}$, yielding partitions 202-206 of the form shown in FIG. 1. Then, the tuple space is sub-partitioned 208-212 along the y-dimension using a set of key ranges $\{r_1^2, r_2^2, r_3^2\}$ shown in FIG. 2. The tuples stored at node $N_1$ in FIG. 1 are thus allocated across nodes $N_{1,1}$, $N_{1,2}$, and $N_{1,3}$.

Composite partitioning is well-suited to handling transactions that access tuples within a range restricted along both the initially and sub-partitioned dimensions. For example, if the tuple space of Equation 7 is partitioned using the key ranges of Equations 8-10 and then along the key ranges of Equations 11-13, the query statement:

```
SELECT
    K₁, K₂
FROM
    S
WHERE
    K₁ = 90210 and K₂ = 'Morris'
``` can be handled by node $N_{3,2}$ alone. Composite partitioning, however, provides lesser benefits when handling transactions that access tuples within a range restricted along a single dimension. In the above example, a statement of the form:

```
SELECT
    K₁, K₂
FROM
    S
WHERE
    K₁ = 90210
``` must be handled by accessing nodes $N_{3,1}$, $N_{3,2}$, and $N_{3,3}$.

Similarly, the statement:

```
SELECT
    K₁, K₂
FROM
    S
WHERE
    K₂ = 'Morris'
``` must be handled by accessing nodes $N_{1,2}$, $N_{2,2}$, and $N_{3,2}$. Thus, in spite of the fact that the database has been partitioned into 9 nodes, handling such transactions requires access to 3 nodes. While this 3:1 increase in access efficiency matches that provided by the partitioning strategy of FIG. 1, it is less than the 9:1 optimal efficiency suggested by the existence of 9 nodes.

Generalizing, let $S^N$ be an N-dimensional tuple space, partitioned along each of M dimensions constituting $S^M$, where $S^M \subset S^N$. For a transaction with R restrictions along the R dimensions constituting $S^R$, the number of nodes that must be accessed to handle the transaction is:

$$A(S^R) = \frac{\prod_{i \in S^M} p_i}{\prod_{j \in S^{R'}} p_j}, \quad (14)$$

where $S^{R'} = S^R \cap S^M$ and $p_k$ denotes the number of partitions along the $k^{th}$ dimension in $S^M$. Considering the ratio of the total number of nodes to the number of nodes that must be accessed provides a measure of the increase in efficiency made possible by the partitioning strategy, namely:

$$E = \frac{\prod_{i \in S^M} p_i}{A(S^R)} = \prod_{j \in S^{R'}} p_j. \quad (15)$$

Therefore, to the extent that the restrictions on a transaction do not restrict along all of the partition dimensions—to the extent that $S^R \neq S^M$—the increase in access efficiency provided by composite partitioning strategies does not match the maximum increase in efficiency suggested by the number of partitions.

The foregoing analysis of access efficiency is somewhat simplified because it assumes that the restrictions are narrow enough to require access to tuples within only one of the ranges specified along each restricted dimension. Although not all transactions are so restricted, it is nevertheless a useful analysis for indicating the typical increase in access efficiency offered by a particular partitioning strategy.

SUMMARY

Described herein is a multidimensional partitioning method that allows transactions restricted along one or more of several partitioned dimensions to be handled by accessing a single node, overcoming limitations imposed by horizontal partitioning and composite partitioning, wherein horizontal partitioning can handle a transaction by accessing a single node only if the transaction is restricted along the single partitioned dimension and wherein composite partitioning allows for partitioning along more than one dimension, but can only handle a transaction by accessing a single node if the transaction is limited along all partitioned dimensions. In the partitioning method described, a tuple space is partitioned along more than one dimension and, by storing tuples redundantly, transactions restricted along one or more of the partitioned dimensions are allowed to be handled by accessing a single node.

DETAILED DESCRIPTION

Horizontal partitioning can handle a transaction by accessing a single node only if the transaction is restricted along the single partitioned dimension. Composite partitioning allows for partitioning along more than one dimension, but can only handle a transaction by accessing a single node if the transaction is limited along all partitioned dimensions. Described herein is a partitioning method that allows transactions restricted along one or more of several partitioned dimensions to be handled by accessing a single node. The described partitioning method partitions a tuple space along more than one dimension and, by storing tuples redundantly, allows transactions restricted along one or more of the partitioned dimensions to be handled by accessing a single node. By storing a partitioned database redundantly, not only can the improvement in access efficiency provided by the present method be realized, but additional benefits such as increased protection against data loss or improved performance in the event of server outages can be realized.

Figure 3:
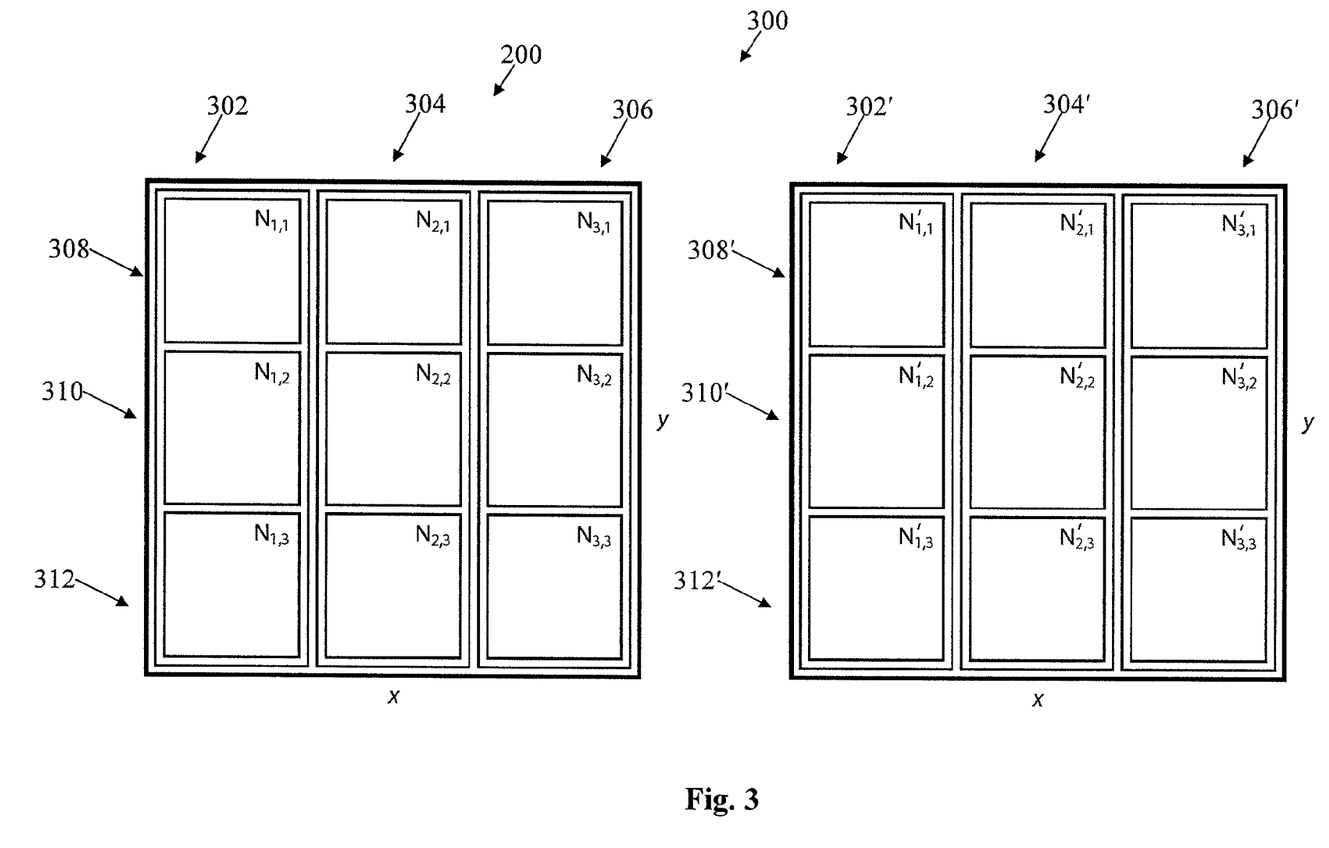
FIG. 3 provides a diagram illustrating redundantly-stored, nested partitions of a multi-dimensional sub-partitioning method.

For example, FIG. 3 shows a conventional approach to providing redundant storage 300 for the tuple space of Equation 7. By first partitioning 302-306, 302'-306' and then sub-partitioning 308-312, 308'-312', the composite partitioning method of FIG. 2 is replicated in its entirety, with node $N'_{ij}$ storing the same tuples as node $N_{ij}$. Redundant storage allows the above transaction:

```
SELECT
    K₁, K₂
FROM
    S
WHERE
    K₁ = 90210
``` to be handled by accessing nodes $N_{3,1}$; $N_{3,2}$; and $N_{3,3}$, or nodes $N'_{3,1}$; $N'_{3,2}$; and $N'_{3,3}$. Modifying Equation 15 by the degree of redundancy q, the increase in efficiency is then given by:

$$E = \frac{q \prod_{i \in S^M} p_i}{A(S^R)} = q \prod_{j \in S^{R'}} p_j. \tag{16}$$

Figure 4:
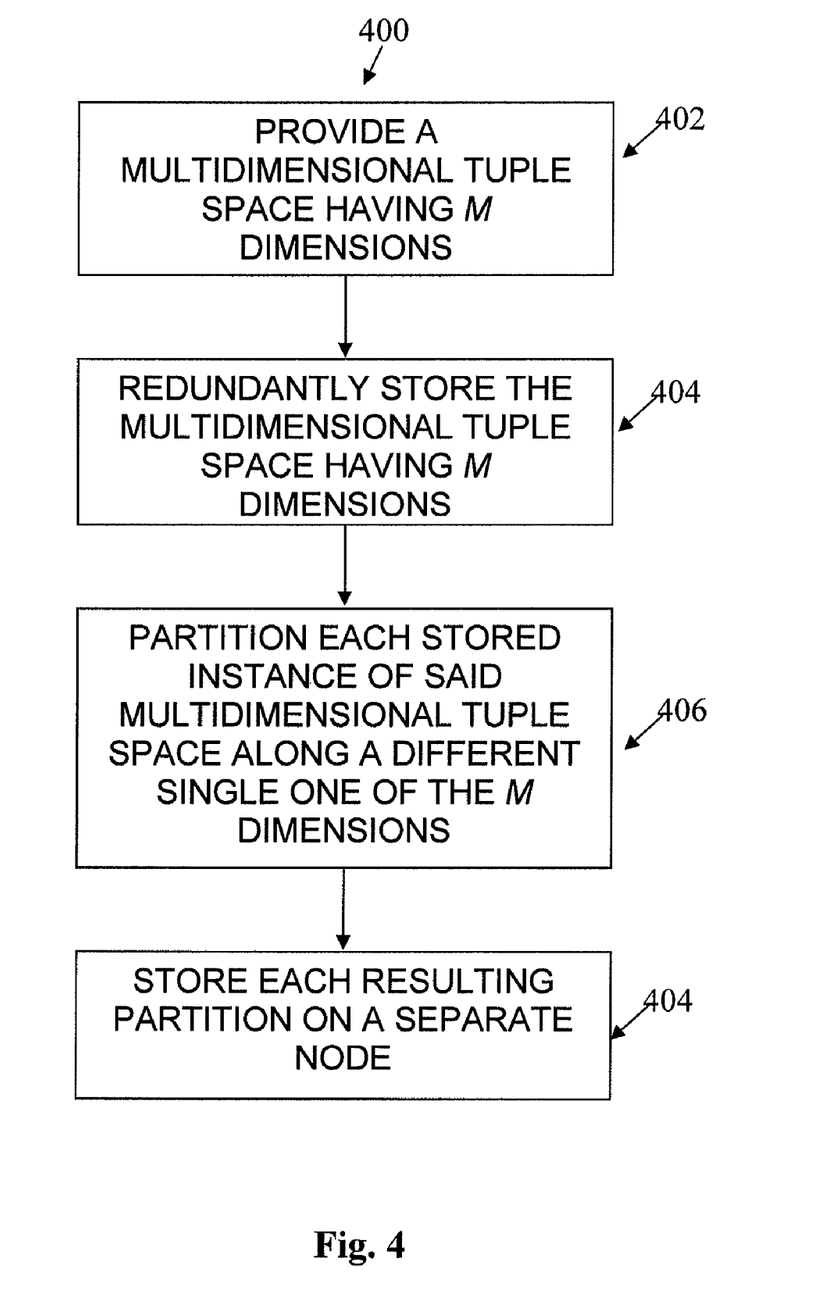
FIG. 4 provides a block diagram of a method for multi-dimensional partitioning with redundant storage.

In contrast to the partitioning method of FIG. 3, which creates partitions in a "nested" fashion, FIG. 4 describes a partitioning method 400 that arrays partitions in a "striped" manner. Generally, as shown in FIG. 4, the method 400 includes at least the steps of:

providing a multidimensional tuple space having M dimensions 402;

redundantly storing the multidimensional tuple space having M dimensions 404;

partitioning each stored instance of the multidimensional tuple space along at least one of the M dimensions 406; and storing each resulting partition on a separate node.

Considering those embodiments in which the degree of redundancy matches the number of partitioned dimensions in the alternative method of FIG. 3 (i.e. those embodiments in which q=M) and in which each instance is partitioned along a single dimension allows for a direct comparison of the two methods. Specifically, according to the partitioning method of FIG. 4, $$\tilde{p} = \prod_{i \in S^M} p_i \tag{17}$$

partitions are created long each of q dimensions in $S^M$. Thus, the total number of nodes:

$$P = q\tilde{p} = q \prod_{i \in S^M} p_i \tag{18}$$

and the fraction of the tuple space covered by each node is the same as in partitioning method of FIG. 3. In other words, the computational burden imposed upon each node is the same as in the partitioning method of FIG. 3. However, unlike the method of FIG. 3, transactions restricted along one or more of the q dimensions can be efficiently handled by accessing a single node. Thus, the partitioning method herein described provides all of the benefits of composite partitioning and, in addition, allows transactions that are restricted along a single dimension to be handled by accessing a single node.

Figure 5:
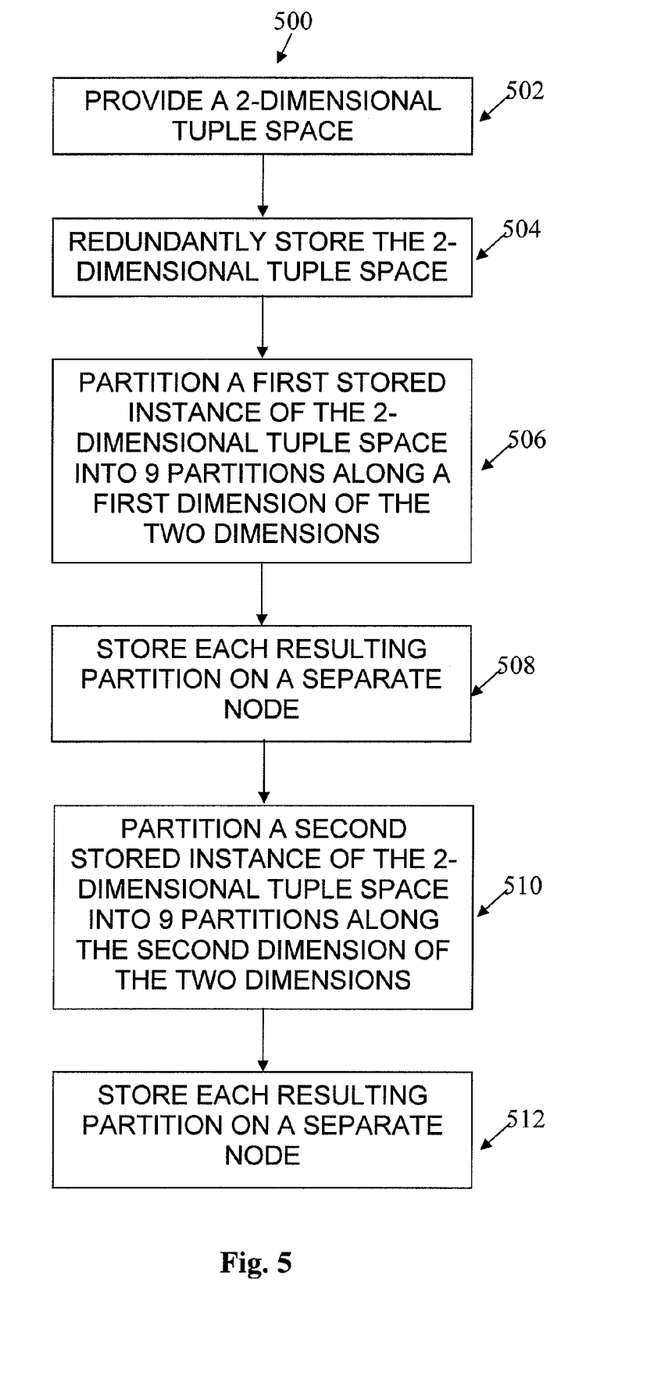
FIG. 5 provides a block diagram of an embodiment of the method of FIG. 4.

FIG. 5 shows an embodiment that is an alternative to the partitioning method of Equations 8-10 and 11-13. The two-dimensional tuple space of Equation 7 may be partioned along two dimensions (M=2) and stored redundantly (q=2), as shown in FIG. 5. In general, the method 500 of FIG. 5 includes at least the steps:
provide a 2-dimensional tuple space 502;
redundantly store the 2-dimensional tuple space 504;
partition a first stored instance of the 2-dimensional tuple space into nine partitions along a first dimension of the two dimensions 506;
store each resulting partition on a separate node 508;
partition a second stored instance of the 2-dimensional tuple space into nine partitions along the second dimension of the two dimensions 510; and
store each resulting partition on a separate node 512.

Figure 6:
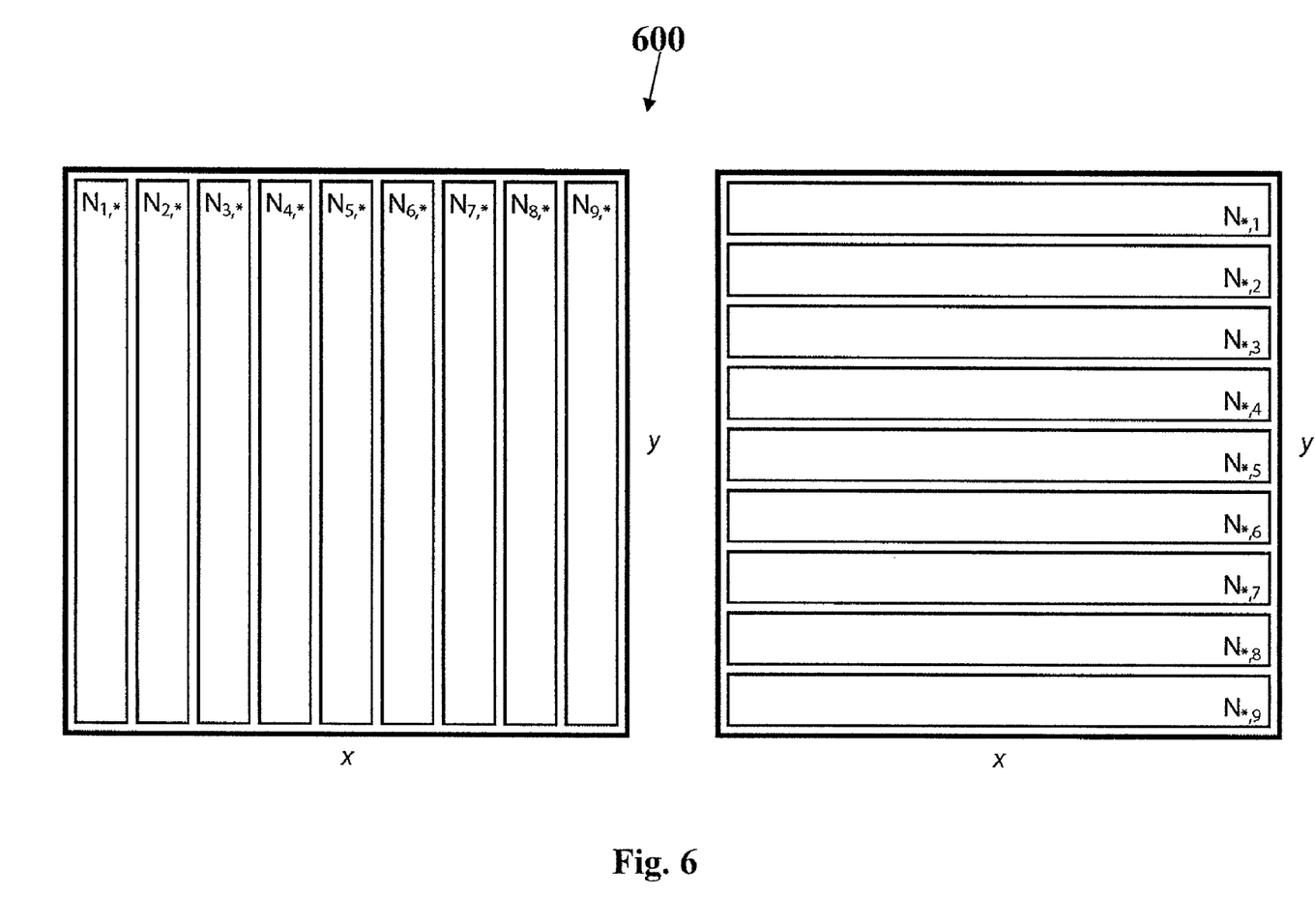
FIG. 6 provides a diagram illustrating overlap in a redundantly-stored tuple space of striped partitions in a multidimensional partitioning method.

As shown in FIG. 6, the tuple space 600 is partitioned into $\tilde{p}=9$ dimensions along the x-dimension, with the resulting dimensions stored on nodes $N_{1,}*$ through $N_{9,}*$. Similarly, the tuple space is partitioned into $\tilde{p}=9$ dimensions along the y-dimension, with the resulting partitions stored on nodes $N*_{,1}$ through $N*_{,9}$. For example, the x-dimension may be partitioned as:

$$\tilde{r}_1^1 = [0, 11111] \quad (19)$$

$$\tilde{r}_2^1 = [11112, 22222] \quad (20)$$

$$\tilde{r}_3^1 = [22223, 33333] \quad (21)$$

$$\tilde{r}_4^1 = [33334, 44444] \quad (22)$$

$$\tilde{r}_5^1 = [44445, 55555] \quad (23)$$

$$\tilde{r}_6^1 = [55556, 66666] \quad (24)$$

$$\tilde{r}_7^1 = [66667, 77777] \quad (25)$$

$$\tilde{r}_8^1 = [77778, 88888] \quad (26)$$

$$\tilde{r}_9^1 = [88889, 99999], \quad (27)$$

and the y-dimension may be partitioned as:

$$\tilde{r}_1^2 = [\text{`- - -'}, \text{`Adams-'}] \quad (28)$$

$$\tilde{r}_2^2 = [\text{`Adamsa'}, \text{`Butler'}] \quad (29)$$

$$\tilde{r}_3^2 = [\text{`Butlera'}, \text{`Davis-'}] \quad (30)$$

$$\tilde{r}_4^2 = [\text{`Davisa'}, \text{`Henin-}] \quad (31)$$

$$\tilde{r}_5^2 = [\text{`Henina'}, \text{`Keane-'}] \quad (32)$$

$$\tilde{r}_6^2 = [\text{`Keanea'}, \text{`Smith-'}] \quad (33)$$

$$\tilde{r}_7^2 = [\text{`Smitha'}, \text{`Ulmer-'}] \quad (34)$$

$$\tilde{r}_8^2 = [\text{`Ulmera'}, \text{`Victor-'}] \quad (35)$$

$$\tilde{r}_9^2 = [\text{`Victora'}, \text{`ZZZZZZ'}]. \quad (36)$$

As can be seen from FIG. 6, the partitions overlap one another within the tuple space. The partitioning is thus redundant, in that a given tuple is stored on more than one node. For example, the tuple (90210, 'Morris') is stored on node $N_{9,}*$ and on node $N*_{,6}$.

Like composite partitioning, the present partitioning method can handle transactions restricted along both the x- and y-dimensions by accessing a single node. Because of the redundant storage, however, the present partitioning method is capable of handling such transactions with either of two nodes, thus providing an additional opportunity for transaction load sharing and balancing. For example, the statement:

```
SELECT
    K₁, K₂
FROM
    S
WHERE
    K₁ = 90210 and K₂ = 'Morris'
``` can be handled by accessing either node $N_{9,}*$ or node $N*_{,6}$.

However, unlike composite partitioning and horizontal partitioning, the present partitioning method can handle transactions restricted along either the x- or y-dimension by accessing a single node. For example, the statement:

```
SELECT
    K₁, K₂
FROM
    S
WHERE
    K₁ = 90210
``` can be handled by accessing node $N_{9,}*$ only, and the statement:

```
SELECT
    K₁, K₂
FROM
    S
WHERE
    K₂ = 'Morris'
``` can be handled by accessing node $N*_{,6}$ only.

While the above example is based on a two-dimensional tuple space, the improvement offered by the present partitioning method extends to N-dimensional tuple spaces. As above, let $S^N$ be an N-dimensional tuple space, partitioned along each of the M dimensions constituting $S^M$, where $S^N \subset S^N$. Any transaction with R restrictions along the R dimensions constituting $S^R$ can be handled by accessing a single node if $S^R \subset S^M$, thus providing a substantial improvement in access efficiency over either horizontal or composite partitioning.

Specifically, compared with the redundant, composite partitioning method of FIG. 3, the presently-described partitioning method provides an efficiency improvement equal to the number of nodes that must be accessed by the redundant, composite partitioning method, $A(S^R)$. As noted above, in databases where redundant storage is independently justified, this improvement in access efficiency is attained without an increase in storage cost.

Figure 7:
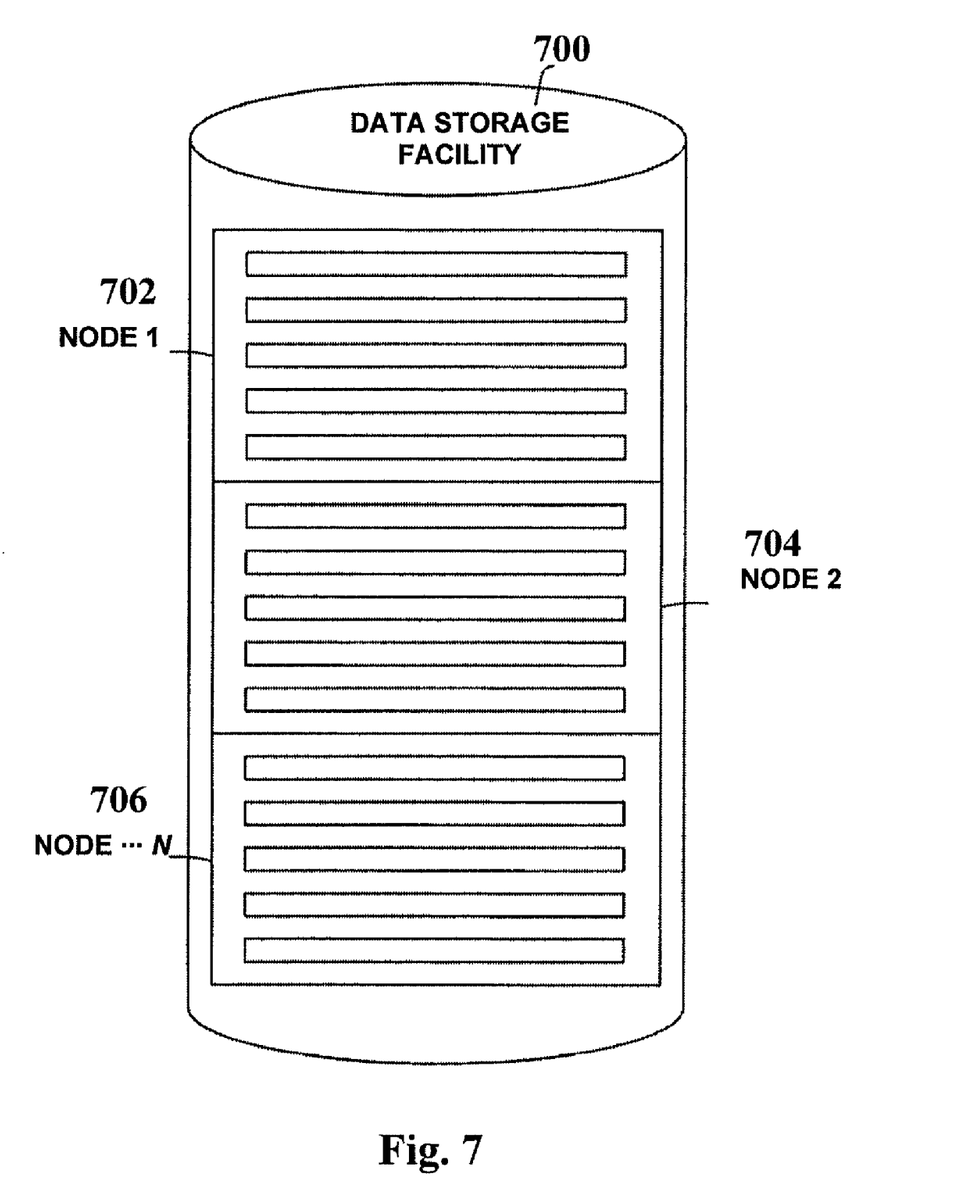
FIG. 7 provides a diagram illustrating storage of multiple nodes on a single data storage unit.

While the foregoing method employs a technique of redundant storage wherein database partitions are stored on separate nodes, different physical embodiments of the resulting database are possible. In one embodiment, multiple logical nodes may be stored on a single data storage facility. As shown in FIG. 7, for example, a single data storage facility 700 is shown that stores logical nodes 1 . . . N. It should be noted that FIG. 7 is illustrative only and is not intended to be limiting.

Figure 8:
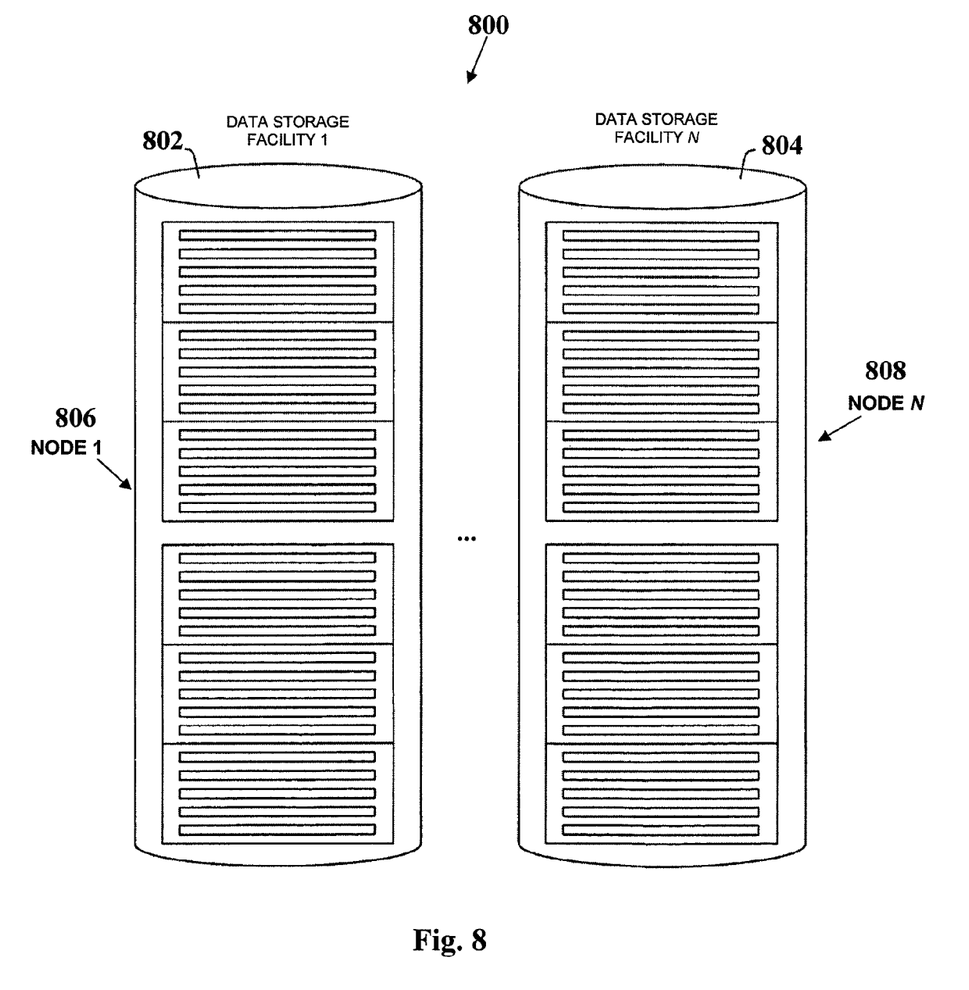
FIG. 8 provides a diagram illustrating storage of multiple nodes across a plurality of storage units.

In a further embodiment, shown in FIG. 8, a database 800 includes multiple data storage facilities 802-804, wherein each data storage facility constitutes a physical node; here, nodes 1 . . . N.

Figure 9:
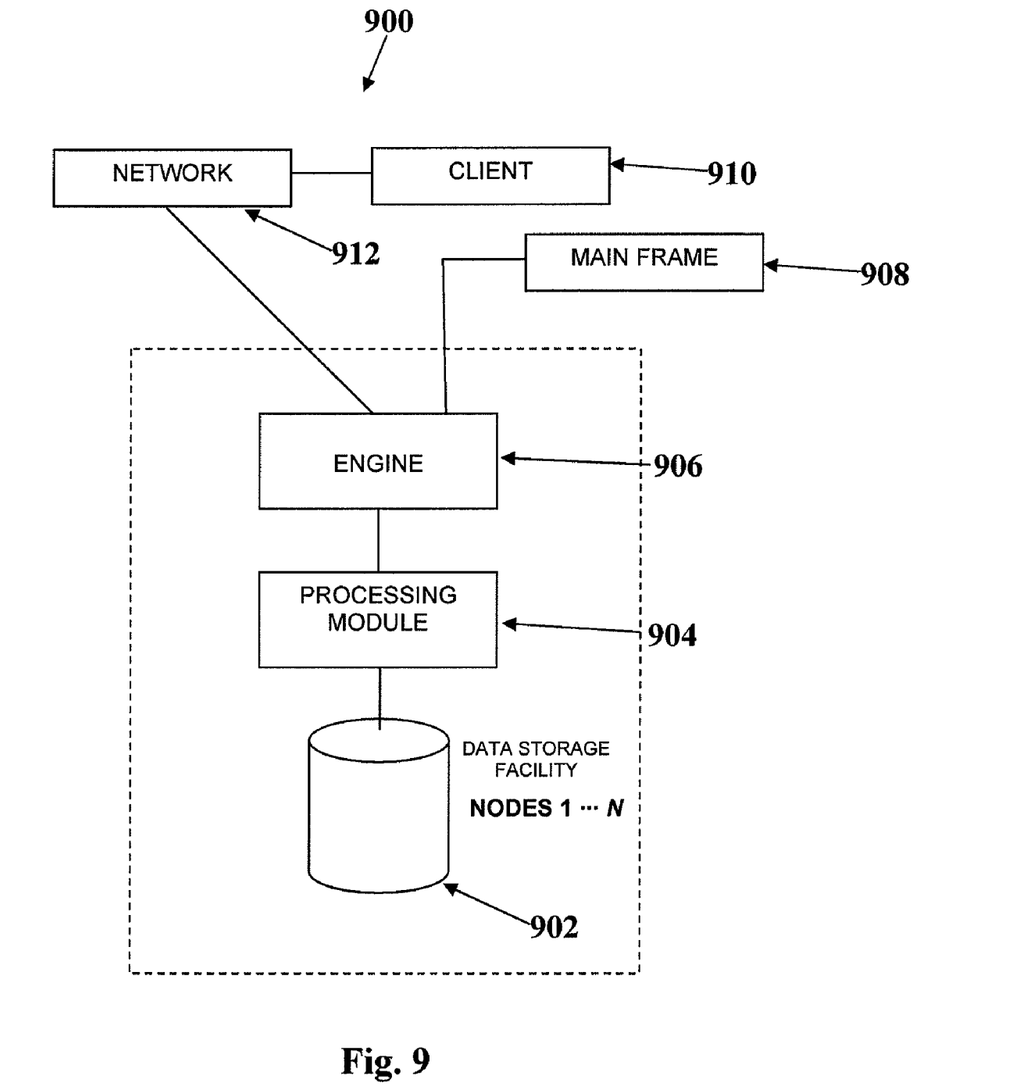
FIG. 9 provides a diagram of a database system that includes a plurality of physical nodes.

The redundant partitioning method may be embodied as a partitioned database system, including combinations of logical and/or physical nodes. For example, FIG. 9 provides a schematic diagram of a partitioned database system 900, wherein logical nodes 1 . . . N may be housed on a single data storage facility 902. One or more processing modules 904 manage the storage and retrieval of data in logical nodes 1 . . . N housed on data storage facility 902. The one or more processors may be one or more physical processors, or one or more virtual processors stored on a single physical processor. In one embodiment, a single virtual processing module may manage a single one of logical nodes 1 . . . N. Data is stored in one or more tables in the data storage facility 902. In one embodiment, a parsing engine 906 may route transactions among the logical nodes 1 . . . N. The parsing engine may also manage execution of transactions received from a user at a mainframe 908 or a client computer 910 connected via a network 912.

Figure 10:
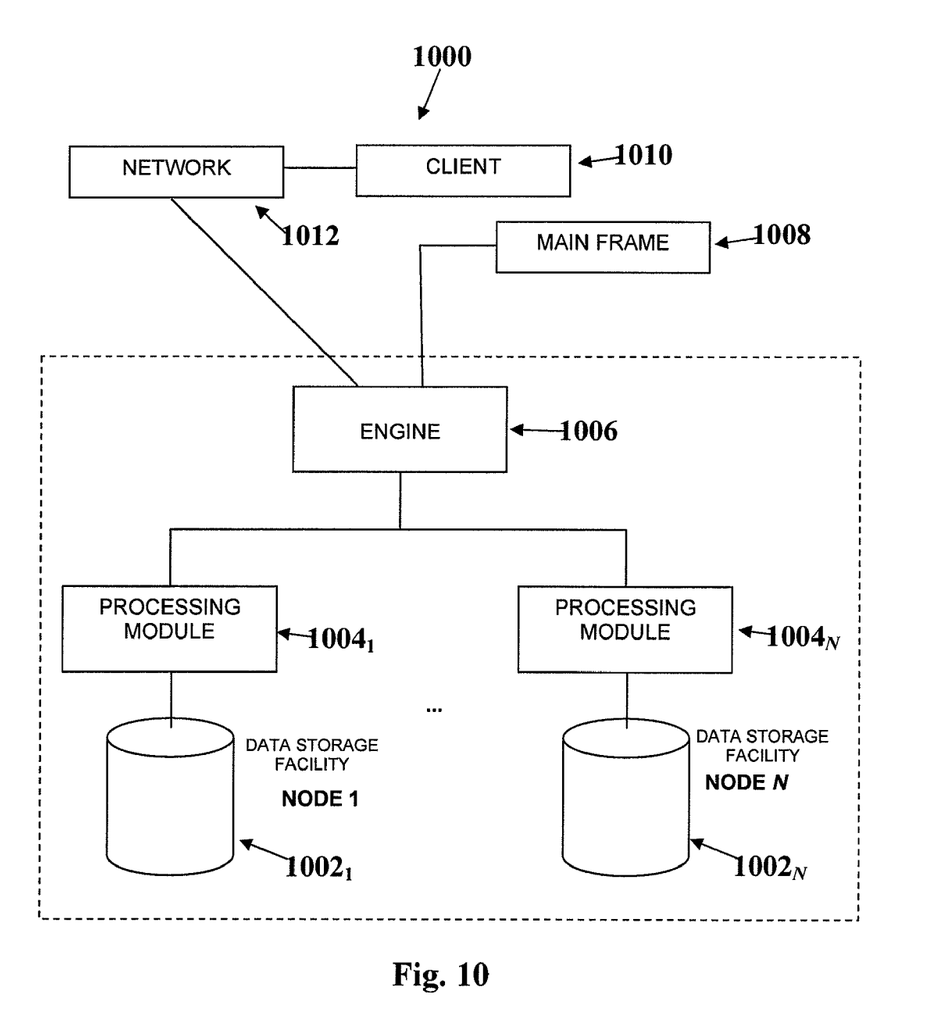
FIG. 10 provides a diagram of a database system that includes a plurality of logical nodes on a single data storage device.

FIG. 10 provides a diagram illustrating a database system 1000 that includes a plurality of physical nodes 1 . . . N 1002 on separate data storage facilities. As in the embodiment of FIG. 9, processing modules $1004_1 \ldots _N$ manage the storage and retrieval of data in physical nodes 1 . . . N. One or more parsing engines 1006 may route transactions among the physical nodes 1 . . . N. Mainframe 1008, client 10010 and network 1012 serve functions substantially similar to the corresponding components in the embodiment of FIG. 9.

In view of the present description, other embodiments may occur to the ordinarily-skilled practitioner. All remain within the scope of the present disclosure.

It should be noted that the present partitioning method can be combined with database indexing techniques. Generally speaking, the particular indexing method adopted is independent of the partitioning strategy. Indexing techniques that are compatible with the partitioning method herein described may include:

local indexes, wherein the index is partitioned in the same manner as the underlying partitioned tuple space. Each partition of a local index corresponds to a single partition of the underlying tuple space;

global partitioned indexes, wherein the index is partitioned using a different partitioning key from the underlying tuple space; and global non-partitioned indexes, wherein the index is not partitioned.

Each node may be indexed on an individual basis as desired by the database designer. However, a particularly effective strategy may be to create an index on the key corresponding to the dimension along which the partition stored on the node was created. For example, in FIG. 6, as node $N^*_{,2}$ stores a partition created along the y-dimension, an index is created on $K_2$. This anticipates the fact that node $N^*_{,2}$ receives queries restricted along the y-dimension. Having the index on $K_2$ allows such queries to be handled more rapidly.

The present partitioning method is described above with reference to partitioning based on key ranges. This approach is typically referred to as 'range' partitioning. The invention is also applicable to other commonly implemented partitioning approaches, such as 'hash', 'list', and 'interval' partitioning, described in greater detail herein below. Also, while the exemplary transactions provided above to illustrate the principles of the present method of partitioning are SELECT statements, for querying tables and views in a database, the invention is applicable to most or all other database transactions, such as INSERT and COPY statements, for inserting new values into a database table and copying new values into a database table from a system file.

Implementation

As above, different embodiments are consistent with each of a plurality of approaches to database partitioning: range, list, hash and interval partitioning— range partitioning: this partitioning mode allows a DBA (database administrator) or developer to partition a tuple space based on key value ranges. For example, a DBA may create a partitioned tuple space that is segmented by three partitions that contain data for the 1980's, 1990's, and everything beyond and including the year 2000;

list partitioning: this partitioning mode allows a DBA to partition a database according to explicitly stated values. For example, when partitioning a database by state, the DBA can state specify explicitly that a first partition contains records having, for example, a value of 'Alabama' in a key corresponding to state names, that a second partition contains records having a key value of 'Alaska', and so on;

hash partitioning: this partitioning mode allows a DBA to separate data based on a computed hash key that is defined on one or more keys, with the end goal typically being an equal distribution of tuples among partitions. For example, a DBA may create a partitioned database having ten partitions wherein the tuples are distributed to the partitions based on a hash of one of the table's keys;

interval partitioning: this partitioning mode extends the capabilities of range partitioning by allowing a DBA to to define equipartitioned ranges using an interval definition. Rather than specifying individual ranges explicitly, the DBMS creates any partition automatically, as needed whenever data for a partition is inserted for the very first time. Interval partitioning greatly improves the manageability of a partitioned database.

Many of the examples in the present Description are expressed in SQL (structured query language), a common database computer language designed for retrieval and management of data in relational database management systems (RDBMS), database schema creation and modification, and database object access control management. Such examples are not intended to convey that the presently-described partitioning method is only compatible with relational databases. In fact, the principles of the partitioning method also find application in other database models, for example in dimensional databases and object databases. Additionally, the principles of the partitioning method may find application with other computer database languages, for example MDX (Multidimensional Expressions), a query language for OLAP (on-line analytical processing) databases, or OQL (object query language), a query language for object-oriented databases.

Figure 11:
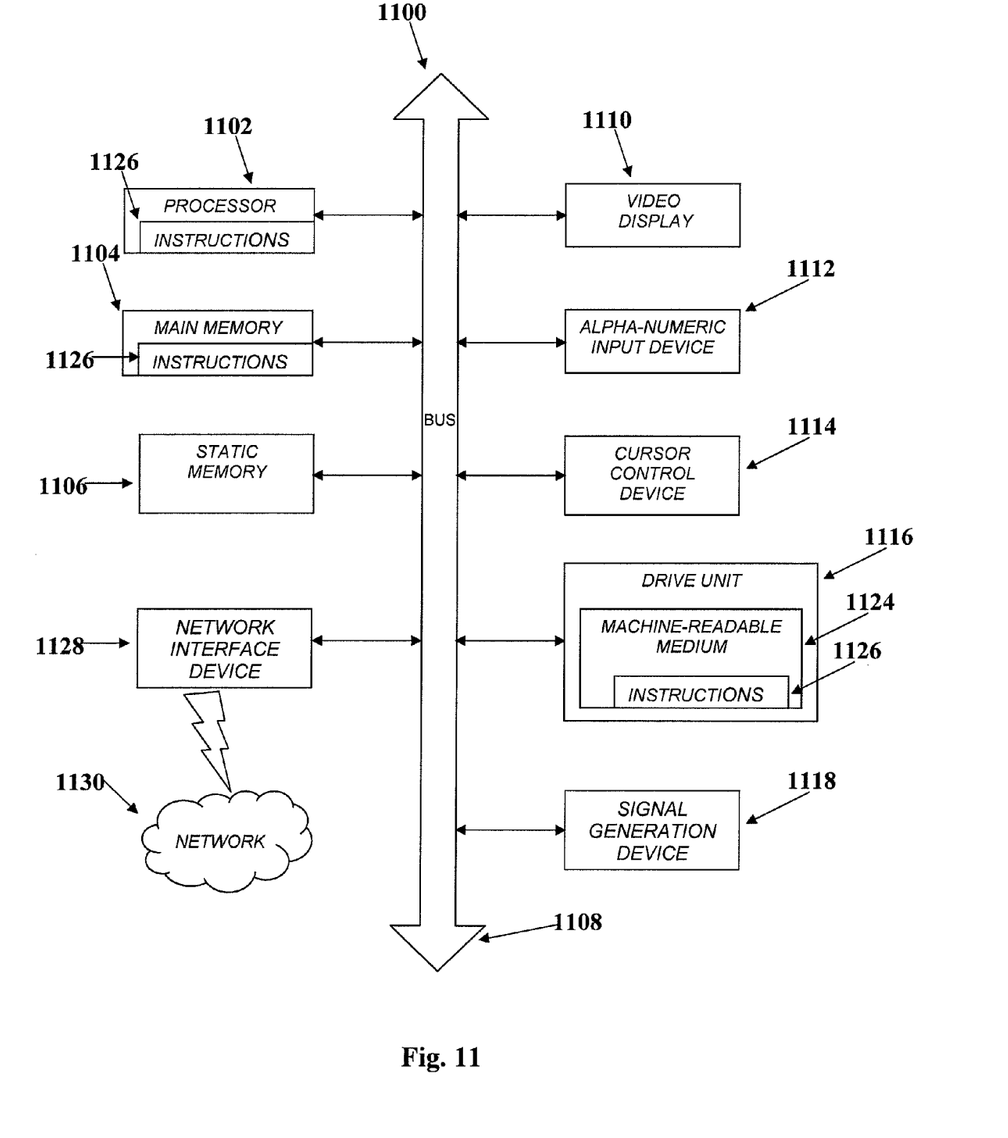
FIG. 11 provides a diagram of a machine in the exemplary form of a computer system within which a set of instructions, for causing the machine to perform or implement any of the systems or methodologies herein described.

Referring now to FIG. 11, shown is a diagrammatic representation of a machine in the exemplary form of a computer system 1100 within which a set of instructions for causing the machine to perform any one of the methodologies discussed herein below may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer system 1100 includes a processor 1102, a main memory 1104 and a static memory 1106, which communicate with each other via a bus 1108. The computer system 1100 may further include a display unit 1110, for example, a liquid crystal display (LCD) or a cathode ray tube (CRT). The computer system 1100 also includes an alphanumeric input device 1112, for example, a keyboard; a cursor control device 1114, for example, a mouse; a disk drive unit 1116, a signal generation device 1118, for example, a speaker, and a network interface device 1128.

The disk drive unit 1116 includes a machine-readable medium 1124 on which is stored a set of executable instructions, i.e. software, 1126 embodying any one, or all, of the methodologies described herein below. The software 1126 is also shown to reside, completely or at least partially, within the main memory 1104 and/or within the processor 1102. The software 1126 may further be transmitted or received over a network 1130 by means of a network interface device 1128.

As will be understood by those familiar with the art, the invention may be embodied in other specific forms without departing from the spirit or essential characteristics thereof. Likewise, the particular naming and division of the modules, agents, managers, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming.

In addition to system and method embodiments, the presently described partitioning approach is also embodied as an article of manufacturing, comprising at least one computer storage medium, such as memory or a disk drive, having embodied thereon computer-readable instructions, which instructions, when executed implement the herein described method of multidimensional database partitioning.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A computer-implemented method for partitioning a database storing tuples within a tuple space having a plurality of dimensions, comprising the steps of:
   partitioning each of two or more redundant instances of said tuple space along one or more of said dimensions of said tuple space, so that partitions of each of said instances overlap partitions of other of said instances within said tuple space; and
   storing each resulting partition on a separate one of a plurality of nodes of a repository, wherein assignment of each partition to a node is based on a location of said each resulting partition in said tuple space;
   wherein said database handles a transaction restricted along less than all of said partitioned dimensions of said tuple space by accessing a single of said nodes.

2. The method of claim 1, wherein said step of partitioning comprises partitioning each of two or more redundant instances of said tuple space along a different one or more of said dimensions of said tuple space.

3. The method of claim 1, wherein said step of partitioning comprises partitioning each of two or more redundant instances of said tuple space along a single one of said dimensions of said tuple space.

4. The method of claim 1, wherein said plurality of nodes comprises any of:
   a plurality of physical nodes;
   a plurality of virtual nodes; and
   a combination of physical and virtual nodes.

5. The method of claim 1, wherein said step of partitioning comprises any of the steps of:
   partitioning an instance according to at least one key range;
   partitioning an instance according to a list containing at least one explicitly stated value;
   partitioning an instance based on a computed hash key; and
   partitioning an instance according to an interval definition.

6. The method of claim 1, further comprising the step of:
   indexing said database.

7. The method of claim 6, wherein said step of indexing said database comprises any of the steps of:
   providing a local index, wherein said local index is partitioned in the same manner as the underlying instance so that each partition of said local index corresponds to a single partition of said underlying instance;
   providing a global partitioned index, wherein said global partitioned index is partitioned in a different manner from the underlying instance; and
   providing a non-partitioned index.

8. The method of claim 1, further comprising the step of:
   identifying at least one tuple satisfying a transaction that is restricted along one or more restricted dimensions of said tuple space among said dimensions of said tuple space by identifying a partition along said restricted dimensions of said tuple space that contains said tuple and accessing the node on which said identified partition is stored.

9. The method of claim 1, wherein the step of:
   identifying at least one tuple satisfying a transaction that is restricted along a single dimension of said tuple space comprises the steps of:
   searching an index to identify at least one partition containing said tuple; and
   accessing the node that stores the partition containing the identified tuple.

10. A computer program product comprising a tangible computer-readable medium embodying computer-readable instructions, which instructions, when executed by a processing module, implement a method for partitioning a database storing tuples within a tuple space having a plurality of dimensions, the method comprising the steps of:
   partitoning each of two or more redundant instances of said tuple space along one or more of said dimensions of said tuple space, so that partitions of each of said instances overlap partitions of other of said instances within said tuple space; and
   storing each resulting partition on a separate one of a plurality of nodes of a repository, wherein assignment of each partition to a node is based on a location of said each resulting partition in said tuple space;
   wherein said database handles a transaction restricted along less than all of said partitioned dimensions of said tuple space by accessing a single of said nodes.

11. The computer program product of claim 10, wherein said step of partitioning comprises partitioning each of two or more redundant instances of said tuple space along a different one or more of said dimensions of said tuple space.

12. The computer program product of claim 10, wherein said step of partitioning comprises partitioning each of two or more redundant instances of said tuple space along a single one of said dimensions of said tuple space.

13. The computer program product of claim 10, wherein said plurality of nodes comprises any of:
   a plurality of physical nodes;
   a plurality of virtual nodes; and
   a combination of physical and virtual nodes.

14. The computer program product of claim 10, wherein said step of partitioning comprises any of the steps of:
   partitioning an instance according to at least one key range;
   partitioning an instance according to a list containing at least one explicitly stated value;
   partitioning an instance based on a computed hash key; and
   partitioning an instance according to an interval definition.

15. The computer program product of claim 10, said method further comprising the step of:
   indexing said database.

16. The computer program product of claim 15, wherein said step of indexing said database comprises any of the steps of:
   providing a local index, wherein said local index is partitioned in the same manner as the underlying instance so that each partition of said local index corresponds to a single partition of said underlying instance;
   providing a global partitioned index, wherein said global partitioned index is partitioned in a different manner from the underlying instance; and
   providing a non-partitioned index.

17. The computer program product of claim 10, said method further comprising the steps of:
   identifying at least one tuple satisfying a transaction that is restricted along one or more restricted dimensions of said tuple space among said dimensions of said tuple space by identifying a partition along said restricted dimensions of said tuple space that contains said tuple; and
   accessing the node on which said identified partition is stored.

18. The computer program product of claim 10, wherein the step of:
   identifying at least one tuple satisfying a transaction that is restricted along a single dimension of said tuple space comprises the steps of:
   searching an index to identify at least one partition containing said tuple; and
   accessing the node that stores the partition containing the identified tuple.

19. A system for partitioning a database storing tuples within a tuple space having a plurality of dimensions, comprising:
   a plurality of nodes comprising at least one data storage device; and
   at least one processor programmed for:
   partitioning each of two or more redundant instances of said tuple space along one or more of said dimensions of said tuple space, so that partitions of each of said instances overlap partitions of other of said instances within said tuple space; and
   storing each resulting partition on a separate one of said plurality of nodes, wherein assignment of each partition to a node is based on a location of said each resulting partition in said tuple space; wherein said database handles a transaction restricted along less than all of said partitioned dimensions of said tuple space by accessing a single one of said nodes.

20. The system of claim 19, wherein the plurality of nodes comprises any of:
   a plurality of physical nodes;
   a plurality of virtual nodes; and
   a combination of physical and virtual nodes.

21. The system of claim 19, wherein said at least one processor comprises any of:
   a single physical processor;
   a plurality of physical processors;
   a plurality of virtual processors running on a single computer; and
   a plurality of virtual processors running on at least one computer.

22. The system of claim 19, wherein said at least one processor comprises:
   a single processor in communication with a single node;
   a single processor in communication with a plurality of nodes; and
   a plurality of processors in communication with a plurality of nodes.

23. The system of claim 19, further comprising at least one processor programmed for managing storage of said partitions on said nodes.

24. The system of claim 19, further comprising a processor programmed to provide an index to said multidimensional database partitioned in the same manner as said multidimensional database is partitioned.

25. The system of claim 24, wherein said index comprises one of:
   at least one data storage device storing therein a local index, wherein the index is partitioned in the same manner as the underlying partitioned database so that each partition of said index corresponds to a single partition of the underlying database;
   at least one data storage device storing therein a global partitioned index, wherein the index is partitioned using a different partitioning key from the underlying database; and
   at least one data storage device storing therein a non-partitioned index.

26. The system of claim 19, further comprising any of:
   at least one mainframe computer; and
   at least one client computer;
   wherein said at least one mainframe computer and said at least one client computer are in communication with said at least one processor by means of a network connection.

27. The system of claim 19, where said at least one processor is further programmed for:
   identifying at least one tuple satisfying a transaction that is restricted along one or more restricted dimensions of said tuple space among said dimensions of said tuple space by identifying a partition along said restricted dimensions of said tuple space that contains said tuple and accessing the node on which said identified partition is stored.

28. The system of claim 19, wherein said at least one processor is further programmed for:
   partitioning each of two or more redundant instances of said tuple space along a different one or more of said dimensions of said tuple space.

29. The system of claim 19, wherein said at least one processor is further programmed for:
  partitioning each of two or more redundant instances of said tuple space along a single one of said dimensions of said tuple space.

30. The system of claim 19, wherein said at least one processor programmed for partitioning is further programmed for any of:
  partitioning an instance according to at least one key range;
  partitioning an instance according to a list containing at least one explicitly stated value;
  partitioning an instance based on a computed hash key; and
  partitioning an instance according to an interval definition.

* * * * *